(12) United States Patent
Russell et al.

(10) Patent No.: US 7,951,003 B2
(45) Date of Patent: May 31, 2011

(54) WIRELESS IDENTIFICATION AND TRACKING IN GAMING SYSTEMS

(75) Inventors: Glen Keith Russell, Las Vegas, NV (US); R. Jeffrey Jordan, Reno, NV (US)

(73) Assignee: IGT, Reno, NV (US)

( * ) Notice: Subject to any disclaimer, the term of this patent is extended or adjusted under 35 U.S.C. 154(b) by 537 days.

(21) Appl. No.: 10/868,622

(22) Filed: Jun. 14, 2004

(65) Prior Publication Data
US 2005/0277471 A1    Dec. 15, 2005

(51) Int. Cl.
*A63F 13/00* (2006.01)
(52) U.S. Cl. ............... 463/42; 463/40; 463/43
(58) Field of Classification Search .......... 463/29, 463/39, 40, 42, 24, 43
See application file for complete search history.

(56) References Cited

U.S. PATENT DOCUMENTS

| | | | |
|---|---|---|---|
| 5,759,102 A * | 6/1998 | Pease et al. ............... | 463/42 |
| 5,770,533 A | 6/1998 | Franchi | |
| 6,048,269 A | 4/2000 | Burns et al. | |
| 6,383,076 B1 * | 5/2002 | Tiedeken .................. | 463/40 |
| 6,976,159 B1 * | 12/2005 | Poduska et al. ............ | 713/1 |
| 2001/0039210 A1 | 11/2001 | St. Denis | |
| 2002/0152120 A1 | 10/2002 | Howington | |
| 2003/0006931 A1 * | 1/2003 | Mages ................. | 342/357.06 |
| 2003/0027631 A1 * | 2/2003 | Hedrick et al. ............ | 463/29 |
| 2003/0148809 A1 | 8/2003 | Nelson | |
| 2003/0204739 A1 | 10/2003 | Ng et al. | |
| 2003/0220139 A1 | 11/2003 | Peterson | |
| 2004/0015423 A1 * | 1/2004 | Walker et al. .............. | 705/34 |
| 2005/0009607 A1 * | 1/2005 | Russell et al. .............. | 463/42 |
| 2005/0131584 A1 * | 6/2005 | Law et al. ................. | 700/300 |
| 2007/0054670 A1 * | 3/2007 | Kalika et al. .............. | 455/446 |

FOREIGN PATENT DOCUMENTS

| | | |
|---|---|---|
| WO | WO 00/52651 | 9/2000 |
| WO | WO 01/91075 | 5/2001 |
| WO | WO 01/76710 | 10/2001 |
| WO | WO 02/058020 | 7/2002 |

OTHER PUBLICATIONS

British Search Report dated Mar. 18, 2005, from corresponding British Application No. GB0425043.7.
European Search Report dated Aug. 11, 2005, from corresponding European Application No. 05253616.6.
European Examination Report dated Aug. 1, 2006, from corresponding European Application No. 05253616.6.
British Examination Report dated Apr. 30, 2007, from corresponding British Application No. GB0425043.7.
Canadian Office Action dated Nov. 8, 2007, from corresponding Canada Application No. 2488203.
Canadian Office Action dated Aug. 27, 2008, from corresponding Canada Application No. 2,488,203.

(Continued)

*Primary Examiner* — James S McClellan
(74) *Attorney, Agent, or Firm* — Weaver, Austin, Villeneuve & Sampson LLP

(57) ABSTRACT

A gaming system has at least two gaming components. Each gaming component has controller, a communications interface, a communication link to allow the controllers of the gaming components to communicate with internal components in either a wired or wireless fashion, a communication link providing for a wireless communications to external systems and/or components, a wireless identification mechanism used to uniquely and automatically identify the gaming device to appropriate sensors, and a positioning system that can relay precise positional data to host systems.

25 Claims, 6 Drawing Sheets

OTHER PUBLICATIONS

Australian Office Action dated Feb. 23, 2010, from Application No. 2004229016.
Examination Report dated Mar. 20, 2009, from European Patent Application No. 02756187.7.
Examination Report dated Aug. 3, 2009, from Canadian Patent Application No. 2,488,203.

Canadian Office Action dated Aug. 5, 2010 issued in 2,488,203.

* cited by examiner

WIRELESS IDENTIFICATION AND TRACKING IN GAMING SYSTEMS

BACKGROUND

As the gaming floors in today's gaming venues continue to expand, the need to monitor and secure devices in that venue becomes a critical component of the informational technology infrastructure. Gaming providers continually look for new and better ways to manage this rapidly expanding inventory in a cost effective manner. As the numbers of devices in a venue increases, the ability to track device locations, identify andlor predict environmental and performance conditions that might lead to failures and to change components rapidly to avoid or fix problems can significantly increase revenues.

The ability to track shipments of gaming devices would alleviate some of this problem. With players demanding more variety and higher levels of entertainment, the ability to move machines within a venue, as well as reconfigure machines to add upgraded components or software should be made easier and more reliable.

In an industry where revenue depends upon the amount of time a device is operational, the ability to monitor, predict, and initiate preventive measures in order to maximize up time is crucial. The ability to perform real time monitoring of environmental conditions within a device, the ability to poll and monitor factors such as CPU performance/load, fan speeds, CPU temperatures, system/memory faults; all may provide valuable data trends that may be utilized to perform predictive analysis and inform/dispatch service personnel before a gaming device faults and is taken offline.

In efforts to further maximize uptime and reduce costs, it would be helpful to be able to easily interface individual components with the master game controller, and to rapidly change out components.

SUMMARY

One embodiment of the invention is a gaming system. The gaming system includes at least two gaming components. Each gaming component includes a controller and a communications interface. The gaming system also includes a wireless communication link to allow the system to communicate positional and environmental conditions to personnel tasked with the tracking and monitoring of said systems.

Another embodiment of the invention is a gaming system with two communications links. An interior communications link provides wireless communications to gaming components arranged inside a cabinet. An exterior communications link provides communications to gaming components located outside the cabinet.

BRIEF DESCRIPTION OF THE DRAWINGS

The invention may be best understood by reading the disclosure with reference to the drawings, wherein.

DETAILED DESCRIPTION OF THE EMBODIMENTS

Where there is a rapidly expanding market such as gaming, with high cost components, the ability to accurately track inventory becomes a critical component of future venue architectures. The addition of wireless tracking devices provides the ability to track equipment from the time it departs the manufacturing facility until it is installed in the gaming venue. As equipment is brought into the receiving areas, venue inventory databases may be automatically updated and manufacturers may be automatically notified of deliveries. Through the addition of wireless technologies such as GPS transmitters, venue management may be simplified.

When a machine is placed or relocated in the venue, databases could be automatically updated to reflect current positional information providing a management with a real time configuration management system. Finally, to combat theft, as machines leave the floor and are removed from the facility, sensors will automatically record the movement and trigger a video capture of the movement as the device leaves the facility. Personnel can also be provided with the ability to track the machines movements and be able to accurately identify the final destination; providing law enforcement personnel with valuable data to be used in asset recovery.

During this discussion, different types of wireless identification and tracking systems will be discussed, such as Radio Frequency Identification (RFID) tags, Global Positioning Satellite (GPS) tags, etc. It must be understood that these devices are just examples and that the scope of the invention includes any type of wireless identification and/or tracking system. These wireless identification and tracking systems and components may be referred to here as wireless tags, with the understanding that the term tag means any type of transponder, powered or not, with onboard intelligence or not.

Figure 1:
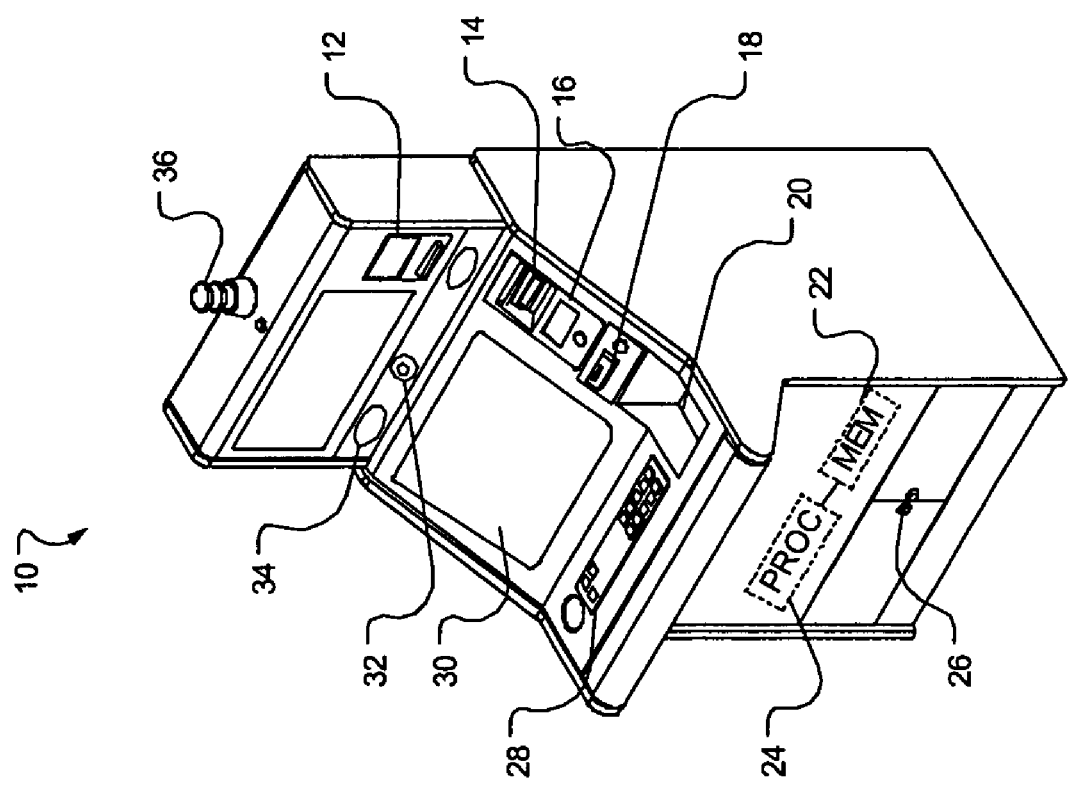
FIG. 1 shows an embodiment of a gaming system having interior and exterior gaming components.

FIG. 1 shows an embodiment of a gaming system 10 having both exterior and interior components. The gaming system may have several components to provide gaming services to users, whom may also be referred to as players. In this particular example, the gaming system has a cabinet, in which are arranged several gaming components. The following discussion gives examples of gaming components and their possible uses. This is not intended to limit either the configuration of a gaming system to these specific gaming components or to limit the uses of the gaming components to the examples given of their possible uses, nor to limit the scope of the claims.

A light or candle 36 may indicate if the game is active, if there is a winner, or to identify a system needing service. A camera 32 may be used to monitor the players, capture video of winners, etc. Speakers such as 34 may provide music, sound effects or voice instructions to the players, and the system may also have a microphone, not shown. A printer 12 provides the capability to print out tickets that may be used to provide the player with a voucher redeemable for cash or to print out other items, such as promotional awards, prize certificates, etc. A bill acceptor 14 and a coin acceptor 18 allow the user to insert money to be wagered on the games. The bill acceptor and coin acceptor may also validate the coins and bills to ensure that the currency inserted is valid, as well as tracking the amount of currency being inserted.

The component referred to here as a bill acceptor 14 may also serve a dual function as a ticket reader. A bill door 16 may provide access to the bill stacker for maintenance functions. A coin hopper 20 dispenses coins when the player cashes out their accumulated winnings The access doors 26 provide interior access to the gaming system components inside the cabinet for service, removal and insertion of new components. Typically located inside the cabinet, in addition to the various controllers for the devices in the gaming system arranged in the cabinet, is a logic assembly and/or processor 24 that may include the game-processing unit. The game processing unit provides the logic components and the distribution media which contain the games that are played by the player on the system, although it is not necessary that the game processing unit be the provider of the games, as will be discussed in more detail later.

The player interacts with the games through the player controls 28 and the display/touch screen 30. The player's progress, as well as the player's account status and other player related information, may be tracked by a player tracking subsystem, which may also be a logic circuit arranged in the cabinet but not always visible to the outside, or a subsystem of the gaming controller/processor 24. All of the gaming components discussed so far, as well as many other possibilities, are all arranged in the cabinet and may or may not be visible to the player. Other components of the system may be outside of the cabinet, such as the external storage, connected to the components in the cabinet by the communications link, and overhead display. The overhead display may take data from the camera and display it so that others than the player may see video capture of the player's game, the player when he or she wins, etc.

These gaming components, whether inside or outside the cabinet, will have a controller of some sort and a communications interface allowing the controllers to access a common communications link among the various gaming components. The controllers may vary greatly between the devices. For example, the coin acceptor and bill acceptor may have simple logic circuits and sensors that identify the insertion of coin or currency, validate that the money is valid, and a simple counter that counts how much money has been inserted. These controllers may also have a rejection function that returns invalid money. Similarly, the coin hopper may have a controller that merely receives a signal to release a certain number of different kinds of coins as winnings.

In contrast, the camera controller may be a high-end video processor that reads signals from a charge-coupled device and converts it to digital video or still image data. Similarly, the player controls controller may be a simple voltage generator that generates a voltage for a particular button push, or may be much more complex input apparatus. The display/touch screen may also have a fairly complex controller, to allow rendering of video images, either from the camera or from a file, as well as receiving and interpreting touch screen inputs. The controllers of these devices, regardless of their complexity will govern the functioning of the gaming component as well as communicate through the communications link with other gaming components.

The gaming system should have some degree of flexibility, allowing gaming components to be switched in and out, added and removed to enhance the gaming experience. The communications link that provides communications between all the components should allow this flexibility. One such communication link is a wireless communications link, where the communications link does not require a physical connection through the traditional cabinet wiring harness.

An example of an external wireless communication link is the communications protocol set out by the Institute of Electrical and Electronic Engineers (IEEE) standard 802.11 (IEEE P802.11), usually implemented (but not limited to) 802.11b/g devices. Typically 802.11b/g communications are typically utilized for WiFi (wireless fidelity) for WLAN (Wireless Local Area Networks) communications.

One example of an enabling technology for the relaying of identification data is via an RFID interface. This technology is usually used to transmit identification data over varying frequencies. Typically high frequency tags are read from about three feet and UHF tags are read from 10 to 20 feet. Where longer ranges are needed, such as for tracking gaming devices, active tags use batteries to boost read ranges to 300 feet or more. These tags are usually considered to be 'dumb' tags, having only a memory register or other storage that can be queried from a querying station. However, it is possible in the future that these tags may be attached to other intelligence, such as sensors and controllers to provide more detailed information.

For internal communications between individual gaming components, an example of an internal wireless communications link is IEEE 802.15.1 (otherwise known as Bluetooth). Bluetooth is typically used for WPAN (Wireless Personal Area Networks) communications. All of these standards set out a communications link that are reconfigurable and extremely flexible and will be discussed with regard to FIG. 2.

Figure 2:
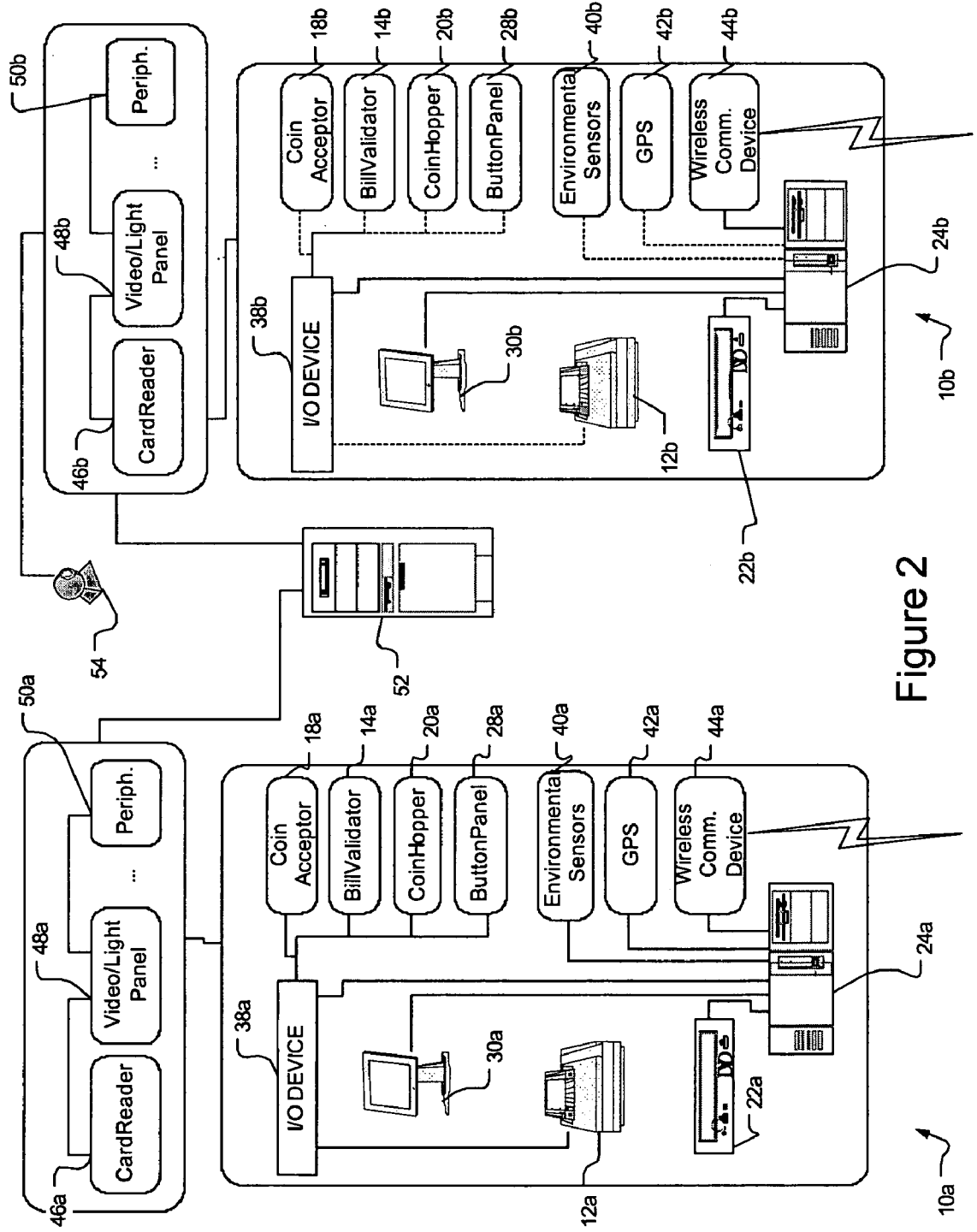
FIG. 2 shows a block diagram of embodiments of alternatively configured gaming systems as part of a venue system.

FIG. 2 shows an embodiment of two gaming systems within a venue system having interior and exterior gaming components, as well as some shared gaming components. All of these gaming components communicate on a client-to-server basis with a dedicated master controller that manages the communications link between the devices. Both utilize a WLAN and RFID technologies to communicate with external systems.

The internal communication links may be configured such that a mixture of wired and wireless components can be interfaced to the main game controller via an internal I/O controller. This provides multiple communications links, one for the gaming components interior to the cabinet, and a communication link between the components in the cabinet and components outside the cabinet.

An example of a gaming system having both an interior communications link in the form of a standard wired I/O controller 38a and a wireless communications link 44a for communications outside of the cabinet is shown in gaming system 10a. The display and touch screen 30a, the printer 12a, the internal storage 22a, the game processing unit 24a, the coin acceptor 18a, the bill acceptor 14a, the coin hopper 20a, the player controls 28a and any unspecified gaming components all communicate with each other and the I/O controller via a standard cabled harness. The unspecified gaming component can be any type of gaming component that the system designer desires, with the understanding that the system designer can add additional components as the designer sees fit.

Components outside the cabinet may communicate via a cabled communications link through the I/O controller 38a, such as the card reader 46a, the video light panel 48a and any other gaming components 50a. The exterior or interior gaming components may in turn communicate with other devices that are shared among gaming systems, such as video camera 54. In addition, external devices may communicate by being cabled to an interior device, such as the external storage or application server 52 being linked with the gaming component.

In contrast, an alternative gaming system 10b has devices cabled together in one communications link or a combination of cabled and wireless devices. In either system, the wireless communications link allows—a high degree of flexibility in communications that are useful in the gaming environment. These devices may also communicate via a wireless link external to the system such as that provided by the wireless communications interface 44b. For security reasons, however, the gaming system may restrict the wireless communications for gaming components to be internal. The tracking components, such as the GPS and sensors, may have internal or external wireless interfaces.

In the alternative wireless gaming system 10b, the display and touch screen 30b, and internal data storage 22b all utilize traditional cabled harnessing. In this same device, the bill validator 14b, coin hopper 20b, button panel 28b, environmental sensors 40b and the printer 12b all communicate with the I/O concentrator via a wireless interface.

Figure 3:
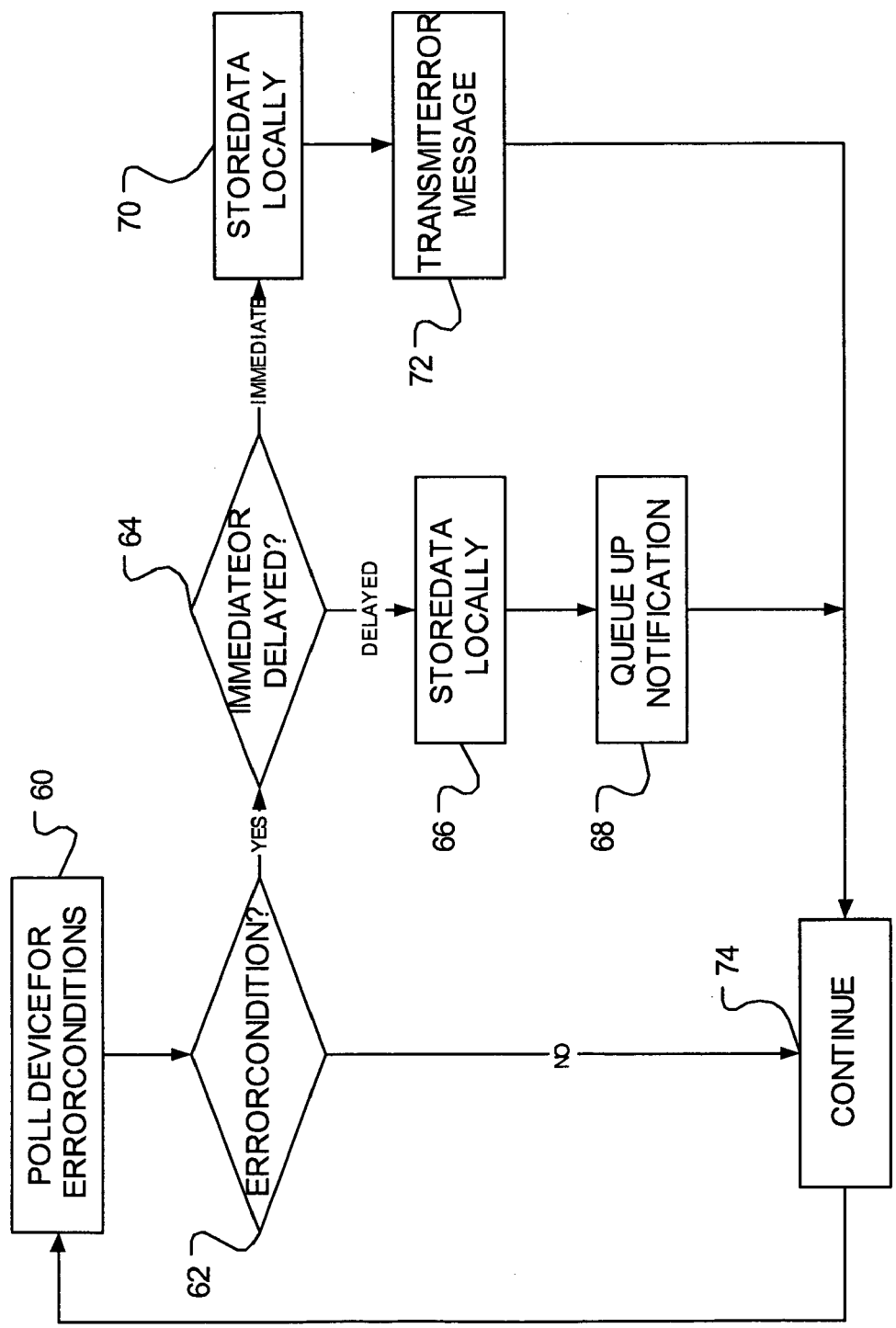
FIG. 3 shows a flowchart of an embodiment of a method to poll gaming systems for information and actions based upon that information.

Utilization of RFID and GPS technology can be described utilizing the scenario as outlined in FIG. 3. A gaming device, when shipped from the manufacturer, will be equipped with an RFID tag with a series of unique identification information such as serial numbers, ids, etc. This tag, when activated, may be used to track the shipment from the moment it passes the sensors at the manufacturing shipping dock until the moment it is received at the gaming venue receiving dock. This provides the ability to automatically update respective inventory and accounting management systems and provide the ability to track and authorize payments, etc. In addition, sensors throughout the gaming venue, in conjunction with GPS technologies, can be used to detect movement on the floor as well as exact positional data that can be relayed to casino/slot management systems.

The information contained on the RFID/GPS tags can be very flexible. The information may include codes for the manufacturing date, manufacturing facility, ownership data, QA inspection date and inspector, revision numbers, part numbers, etc. It would allow not only ownership tracking, but maintenance and usage history tracking as well, as is discussed in more detail below.

The information, whatever that is selected to be, contained on the tags may be encrypted, such as a public/private key mechanism, allowing establishment of an encrypted tunnel for wireless communications. In addition, there may be a multi-level security system in place on the tags. If a tag has several different pieces of information on it, each piece may only be revealed to a particular type of inquiry. The data could be encrypted such that only the minimum of information needed for a particular task is revealed.

For example, a maintenance technician needs to query a machine to get the serial number of the bill hopper, such as one used to replace a malfunctioning hopper. The system would respond only with that information and no other information. In another example, the technician inquires about the operating hours so far on a system. The machine would respond with just that information, not the serial number of the system or any of the devices.

For use in tracking gaming devices that have been stolen or misplaced, the enabling GPS technology can be used to track and locate equipment; thus enabling appropriate personnel to be notified and initiate recovery. This will be discussed with regard to FIG. 7.

Another example of this enabling technology is the polling and transmission of error conditions occurring due to problems in environmental conditions or operational faults. Through the real-time gathering and dissemination of this data, an analysis may detect trends and take preventive measures before a failure causes a machine to be taken offline. Using this predictive analysis certain conditions such as CPU temperatures, fan speeds, I/O resets, etc. can be used to predict when faults will occur and thus automatically dispatch service personnel before the machine becomes inoperational. This maximizes up time and makes the system more efficient.

In FIG. 3, a general embodiment of a method to poll gaming systems for error conditions is shown in flow chart form. At 60, a central venue controller or other device such as a local server, polls the gaming system for error conditions. An error condition could be one of many things, such as an environmental parameter going outside its operational envelope, a software problem or a hardware fault. If an error condition is detected at 62, a determination is made at 64 as to the priority of the error condition. If the condition requires immediate attention at 64, the data related to the error condition is stored locally at 70 and then an error message is transmitted in response to the polling at 72. If the condition does not require immediate attention, but can be delayed, the data is stored locally at 66. A flag or other indicator may be set at 68 to ensure that the data related to the error condition is transmitted at the regularly scheduled update interval between the venue controller or system and the gaming system. And polling continues at 74.

In this manner, error conditions that require immediate attention are brought to the attention of the venue management and those that do not are sent during regularly scheduled updates. This allows at least two tiers of responses and at least two levels of communication. For example, assume the internal temperature of the system is supposed to stay between 85 and 115 degrees. If some immediate condition occurs, such as a fan failure, the temperature could go from being in its optimal range to exceeding the threshold between regular communications. This would result in an immediate error message and a response from management. If, however, a warning level was set, say at 105 degrees, the warning would be transmitted as a regular update and management then has some flexibility to schedule a maintenance visit.

Figure 5:
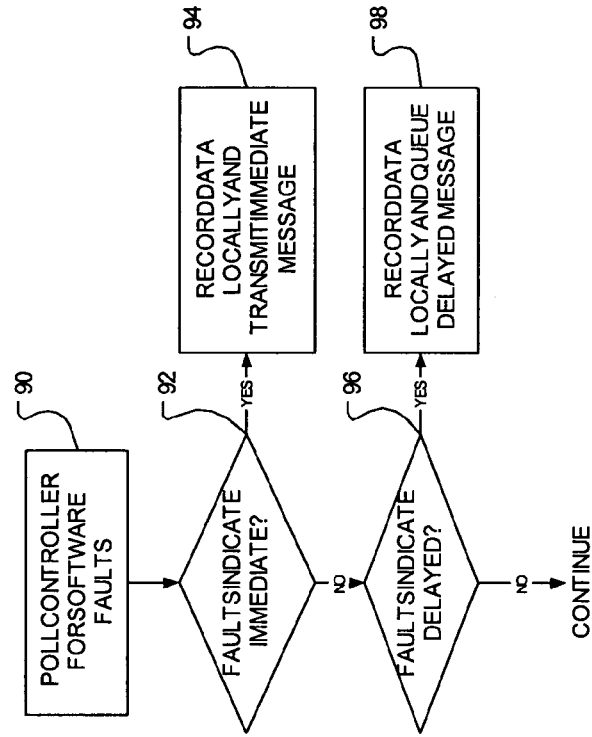
FIG. 5 shows a flow chart of an embodiment of a method of collecting data with regard to software performance of a gaming system.
Figure 4:
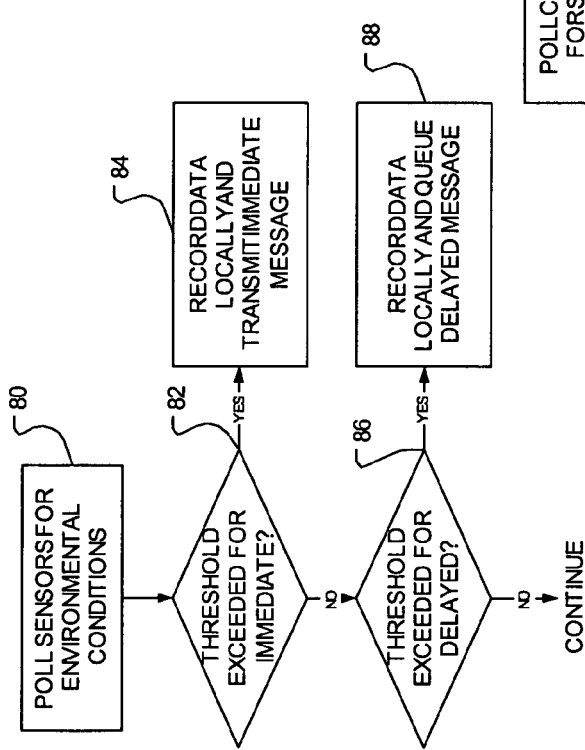
FIG. 4 shows a flow chart of an embodiment of data collection and dissemination of environmental conditions in a gaming device.
Figure 6:
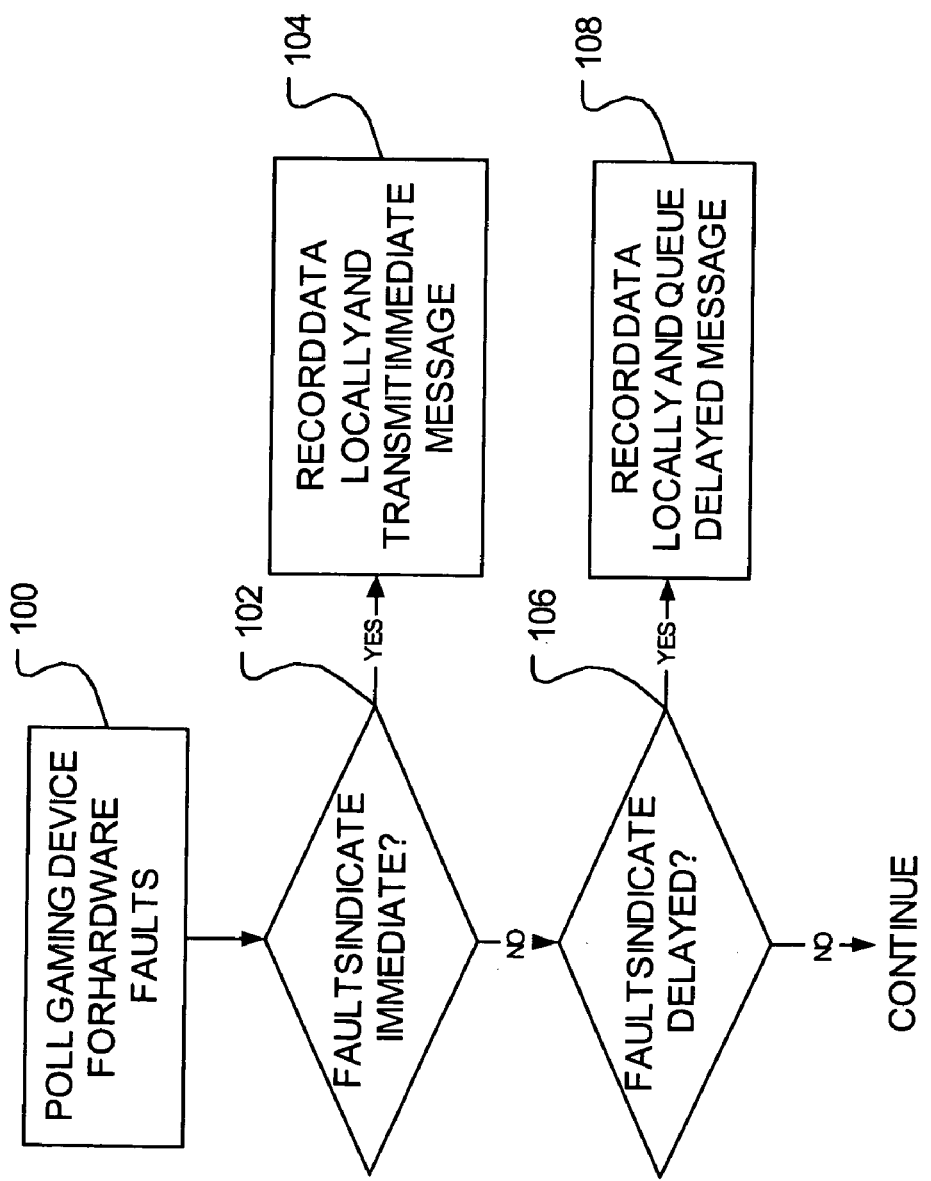
FIG. 6 shows a flow chart of an embodiment of a method of collecting data with regard to hardware performance of a gaming system.

FIGS. 4-6 show more specific embodiments of polling and response communications between the individual gaming systems and some component of the venue management system. In FIG. 4, the venue management system, or the internal game controller, poils the sensors for environmental conditions at 80. If the threshold for immediate notification at 82 is exceeded the data is stored locally at 84 and a message is transmitted indicating the problem, the venue management system may dispatch a maintenance person to fix the machine. If the polling entity were the master gaming controller in the system, the gaming controller would then transmit a message to the venue management system indicating a failure. If the threshold is exceeded but not so far as to require immediate attention at 86, the data is stored locally and the message is queue up to be transmitted at the regular interval at 88.

It should be noted that the storage of the data locally might facilitate a shorter interval for repair and return of the gaming system to the venue floor. The maintenance person may not have access to the venue management system in a convenient manner while on the floor. With the data related to the error condition being stored in the gaming system, the worker can access the data without having to access the main host system. In a larger venue with multiple gaming systems, this may provide faster response and repair time.

Similar scenarios may occur for software faults, an example of which is shown in FIG. 5. More than likely, in this instance the polling entity would be the venue management system and the polled entity would be the master gaming controller. The controller would be polled at 90 and the faults determined to be either immediate at 92 or delayed at 96. If the faults indicate immediate attention is needed, the data is stored locally and the message transmitted at 94. If the faults indicate that delayed transmission is sufficient, the data is stored locally and the message queued at 98.

FIG. 6 shows an embodiment involving hardware failures. The gaming system, either via the gaming controller, or the individual components with communications ability, is polled for hardware faults at 100. If the faults indicate immediate attention is needed at 102, the data is stored locally and the message transmitted at 104. If the faults do not require immediate attention at 106, the data is recorded locally and the message is queued at 108.

Another use of individually tagged components is the ability to track the component history. Maintenance modifications, installation dates, operating hours, etc., could be included on the tag. A maintenance technician could scan the tags of the components internal to the gaming machine and find out the maintenance/ownership of the individual components for preventative maintenance, inventorying and other tracking needs.

The use of individual components having wireless tags may aid in inventory and tracking of individual components. For example, a coin hopper may have failed in one system and required replacement. The maintenance worker replaces the coin hopper with a new one. The master gaming controller or venue management system then reconfigures the records in the database to indicate that gaming system now has a new coin hopper. The master gaming controller within the systems, or the venue management systems, discovers the new component in that system, detects that the ID has changed and reconfigures the system information in the database. The inventory tracking system may also use the information to note that one less coin hopper is available for replacement purposes.

As mentioned above, wireless tags are generally considered to be some sort of storage with no on-board intelligence. However, it is possible that wireless tags may become more intelligent. For example, there could be a system ID tag that has as its subcomponents the tag values for each component in the system. When a component is switched out the system tag may update itself and then respond to a query, or broadcast, the system tag including the new information.

In addition to the local uses of wireless tags, the use of far-ranging wireless tags may provide many uses. One example of a far-ranging tag is a GPS tag. Gaming systems have several expensive components that may become the target of thieves, as well as the entire system itself. It would be an advantage to be able to track gaming systems during transit between manufactures and venues, as well as around gaming venues.

Figure 7:
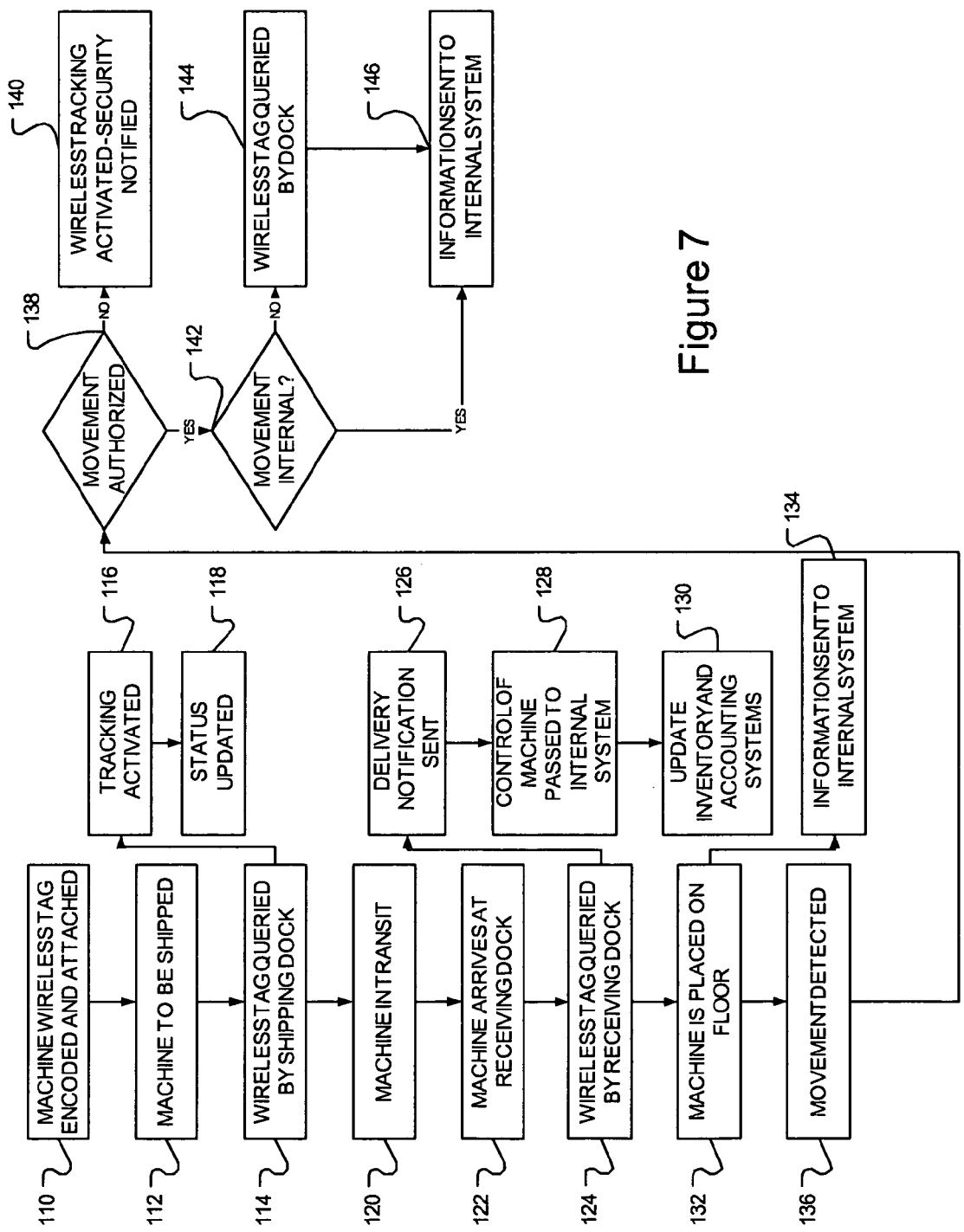
FIG. 7 shows a flow chart of an embodiment of a method to track positions of a gaming system.

An example of this type of process is shown in FIG. 7. At 110 a wireless tag is encoded and attached to the gaming system or component. When the machine is ready for shipment at 112, it is moved out on to the loading dock at the shipping end. The monitors at the shipping dock then query the tag at 114. The tracking is activated at 116 and the status of the machine is updated on the shipping end at 118. The machine then goes into transit at 120. If the machine does not arrive at the shipping dock, the wireless tag can be tracked and the machine located.

When the machine arrives at the receiving dock at 122, the receiving dock queries the tag at 124. A delivery notification may be sent to the shipper at 126, a new entry may be entered into the internal system at the receiving entity at 128 and the inventory and accounting systems updated at 130. The machine can now be tracked in the venue and is placed on the venue floor at 132 and information is sent to the internal system at 134.

If movement is detected at 136, the venue management system first determines if the movement is authorized at 138. The movement may be merely a part of a reconfiguration of a particular floor layout, etc. If the movement is not authorized the wireless tracking is activated if necessary and the appropriate security and law enforcement people are notified at 140. If the movement is authorized, the venue management system then determines if the movement is going to be internal or external at 142. If the movement is internal, the information is sent to the internal system at 146 with the new position of the system on the venue floor. If the movement is external, the process queries the tag at the shipping dock at 144 and the internal system is updated. It may well occur that as the machine is prepared for shipment, such as to another gaming venue, the process will return to 114 and repeat.

It must be noted that the wireless tag may or may not be the GPS or other far-ranging tag monitored for movement once the machine is on the floor. The venue management system may use a local tag to track internal movements. In addition, the venue management system could be embodied in several ways. For example, the system could be a central system communicating with the gaming systems. The system could have monitoring stations at strategic points around the venue, such as by entrances and exist. Alternatively, the system could be implemented as handheld 'auditing' units that are moved around the floor by venue personnel to ensure the location of the gaming systems.

The protection of the ID tags themselves is also possible. Many RFID and GPS tags come with tamper resistance, removal protection and detection. These techniques can be active, such as when a tag is removed, opened or otherwise tampered with, the tag could send a message to any local base stations informing them of the tamper. The tag may even have an alarm wired to the device or system to which it is attached, allowing it to trigger an alarm device at the system. Passive techniques may involve recording when a tag was tampered with or may provide identification of to which component the tag is supposed to attach. A difference between the component to which the tag is supposed to be attached and the actual component to which it is attached would indicate tampering or removal from one component and placement on another.

As can be seen, the examples of the operation of this type of gaming system are wide and varied. Although there has been described to this point a particular embodiment for a method and apparatus for a gaming system having wireless tracking and identification, it is not intended that such specific references be considered as limitations upon the scope of this invention except in-so-far as set forth in the following claims.

What is claimed is:

1. A gaming system, comprising
   at least two gaming components arranged in a cabinet of a gaming machine, each gaming component comprising:
     a controller, and
     a communications interface;
   a main game controller arranged in the cabinet of the gaming machine;
   at least one gaming component located outside the cabinet in communication with the main game controller;

an interior communications link configured to allow the at least two gaming components to communicate through their respective communication interfaces with the main game controller in a wireless fashion, the interior communications link using a first communication protocol;

an exterior wireless communications link configured to allow the at least two gaming components arranged in the cabinet to communicate with an external system such that the gaming machine can be polled and a message transmitted in response indicative of an error condition, the exterior communications link using a second communication protocol different from said first communication protocol; and wherein the external system is configured and arranged to analyze information about error conditions so as to detect trends to permit preventative measures to be identified before a failure occurs in the gaming machine that would result in the gaming machine being taken off-line.

2. The gaming system of claim 1, wherein one of the at least two gaming components arranged in the cabinet comprise a game-processing unit.

3. The gaming system of claim 1, wherein the at least two gaming components arranged in the cabinet comprise at least two gaming components operable to communicate wirelessly to an I/O controller or the main game controller.

4. The gaming system of claim 1, wherein the interior communication link utilizes an 802.15.1 interface.

5. The gaming system of claim 1, wherein the exterior communications link includes an IEEE 802.11b/g wireless communications link.

6. The gaming system of claim 1, wherein the exterior communications link includes an RFID tag interface.

7. The gaming system of claim 1, wherein the exterior communications link includes a GPS link.

8. The gaming system of claim 1, wherein the exterior communications link includes an encrypted link.

9. A gaming system comprising:
at least two gaming components arranged in a cabinet of a gaming machine, each gaming component including:
a controller, and
a communications interface;
a main game controller arranged in the cabinet of the gaming machine;
a first communications link using a first communication protocol configured to allow the least two gaming components to communicate through their respective communication interfaces with the main game controller in a wireless fashion; and
the main game controller being configured to:
monitor the gaming machine to detect an error condition in the gaming machine,
wirelessly transmit via a second communications link using a second communication protocol different from said first communication protocol an immediate maintenance request if a detected error condition requires immediate attention, and
wirelessly transmit via the second communications link a delayed maintenance request if a detected error condition does not require immediate attention.

10. The gaming system of claim 9 wherein the gaming machine includes a plurality of environmental sensors, and wherein the main game controller is in communication with the environmental sensors and is configured to monitor at least the environmental sensors to detect an error condition.

11. The gaming system of claim 10 wherein the main game controller is configured to determine that a detected error condition does not require immediate attention if an environmental parameter sensed by an environmental sensor deviates from a desired state by more than a first threshold amount but less than a second threshold amount.

12. The gaming system of claim 11 wherein the main game controller is configured to determine that the detected error condition requires immediate attention if the environmental parameter deviates from the desired state by more than the second threshold amount.

13. The gaming system of claim 10 wherein the main game controller is configured to poll the environmental sensors.

14. The gaming system of claim 10 wherein the main game controller is configured to detect the error conditions by monitoring: environmental parameters sensed by the environmental sensors, software faults and hardware faults.

15. The gaming system of claim 10 wherein the plurality of environment sensors include a CPU temperature sensor for detecting a temperature of a Central Processing Unit (CPU) of the gaming machine.

16. The gaming system of claim 15 wherein the plurality of environment sensors further include a CPU fan speed sensor for detecting a speed of a CPU fan configured to cool the CPU.

17. The gaming system of claim 16 wherein the main game controller is configured to detect the error conditions by monitoring at least the CPU temperature, the CPU fan speed, Input/Output (I/O) resets, software faults and hardware faults.

18. The gaming system of claim 9, further comprising:
the second communications link configured to provide wireless communications to at least one of an external system and a component such that the gaming system can be polled and a message transmitted in response indicative of an error condition;
a wireless identification mechanism configured to identify the gaming system to an appropriate sensor; and
a positioning system configured to relay positional data of the gaming system to a host system.

19. The gaming system of claim 1, wherein an identification protocol for the wireless identification mechanism comprises a protocol compliant with standard RFID protocols.

20. The gaming system of claim 1, wherein an identification protocol for the wireless identification mechanism comprises a protocol compliant with standard GPS protocols.

21. The gaming system of claim 1, wherein the wireless identification mechanism is tamper resistant.

22. The gaming system of claim 9, wherein one of the at least two gaming components comprise a game processing unit.

23. The gaming system of claim 9, wherein the at least two gaming components are selected from the group comprised of: a game processing unit, a camera, a printer, a storage device, a coin hopper, a light display, a button panel, a ticket reader, a bill validator, a speaker, a microphone, and a card reader.

24. The gaming system of claim 9, the second communications link further comprising a link compliant with IEEE 802.11b/g.

25. The gaming system of claim 24, the first communications link further comprising a link compliant with IEEE 802.15.1.

* * * * *